United States Patent Office 3,455,972
Patented July 15, 1969

3,455,972
NOVEL 6-SPIRO-(6',6'-DIHALOCYCLOPROPYL) STEROIDS
John A. Edwards, Los Altos, and John H. Fried, Palo Alto, Calif., assignors to Syntex Corporation, Panama, Panama, a corporation of Panama
No Drawing. Filed Oct. 9, 1967, Ser. No. 673,918
Int. Cl. C07c 169/10, 169/22
U.S. Cl. 260—397.4                    10 Claims

ABSTRACT OF THE DISCLOSURE 6-spiro-(6',6'-dihalocyclopropyl) steroids of the androstane and 19-norandrostane series having anabolic and progestational activity.

The present invention relates to novel 6-spiro-(6',6'-dihalocyclopropyl) steroids of the androst-4-ene and 19-norandrost-4-ene series. More particularly, this invention relates to novel 6-spiro-(6',6'-dihalocyclopropyl) steroids of the following Formulas A and B:

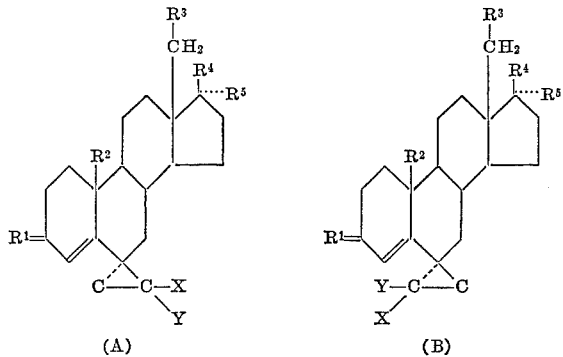

(A)                    (B)

wherein,
each of X and Y is chloro or fluoro;
$R^1$ is oxo or the group

in which $R^6$ is hydroxy and the conventional hydrolyzable ester thereof, tetrahydropyran-2-yloxy or tetrahydrofuran-2-yloxy;
$R^2$ is hydrogen or methyl;
$R^3$ is hydrogen, methyl, ethyl or n-propyl;
$R^4$ is hydroxy and the conventional hydrolyzable esters thereof, tetrahydropyran-2-yloxy or tetrahydrofuran-2-yloxy; and
$R^5$ is hydrogen, lower alkyl, lower alkenyl, lower alkynyl, halo lower alkynyl, or when taken together with $R^4$ is oxo.

As used herein, the term "lower alkyl" means a saturated aliphatic hydrocarbon group of one to six carbon atoms such as methyl, ethyl, i-propyl, n-propyl, butyl, and the like. The term "lower alkenyl" refers to a mono-ethylenically unsaturated hydrocarbon group of two to six carbon atoms such as vinyl, propenyl, and the like. The terms "lower alkynyl" and "halo lower alkynyl" refer to an alkynyl group of two to six carbon atoms such as ethynyl, chloroethynyl, fluoroethynyl, propynyl, and the like.

The term "conventional hydrolyzable ester" as used herein denotes those hydrolyzable ester groups conventionally employed in the steroid art, preferably, those derived from hydrocarbon carboxylic acids or phosphoric acids and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, pelargonate, acrylate, undecenoate, phenoxyacetate, benzoate, phenylacetate, diphenylacetate, diethylacetate, trimethylacetate, t-butylacetate, trimethylhexanoate, methyl-neopentylacetate, cyclohexylacetate, cyclopentylpropionate, adamantotate, glycolate, methoxyacetate, 2-chlonate, hemi-adipate, hemi-β,β-dimethylglutarate, acetoxyacetate, 2-chloro-4-nitrobenzoate, aminoacetate, diethylaminoacetate, piperidinoacetate, β-chloropropionate, trichloroacetate, β-chlorobutyrate, dihydrogen phosphate, dibenzyl phosphate, benzyl hydrogen phosphate, sodium benzyl phosphate, cyclohexylammonium benzyl phosphate, sodium phenyl phosphate, sodium ethyl phosphate, di-p-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

The novel compounds of the present invention are obtained according to a process which can be illustrated as follows using for the sake of simplicity only rings A and B of the steroid molecule.

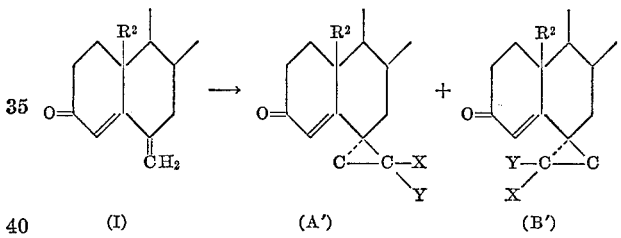

(I)          (A')          (B')

In the above formulas, $R^2$, X and Y are as defined hereinabove. In the practice of the foregoing process, a 6-methylene compound of Formula I is treated with a dihalocarbene generated, for example, from alkali metal salts of haloacetic acids, e.g. sodium chlorodifluoroacetate, sodium trichloroacetate or sodium dichlorofluoroacetate to yield a mixture of the 6-spiro-(6'α,6'α-dihalocyclopropyl) and 6-spiro-(6'β,6'β-dihalocyclopropyl) derivatives which is separated by conventional techniques such as chromatography or fractional crystallization. The reaction is conducted under anhydrous conditions in an inert organic solvent such as diethyleneglycol dimethyl ether (diglyme), triethyleneglycol dimethyl ether, or the like at about reflux temperature.

Typical starting materials or Formula I include 6-methylene-19-norandrost-4-ene-3,17-dione, 6-methylene-17β-acetoxy-19-norandrost-4-en-3-one, 6-methylene-17α-lower alkyl 17β-acetoxy-19-norandrost-4-en-3-one, 6-methyleneandrost-4-ene-3,17-dione, 6-methylene-18-methylandrost-4-ene-3,17-dione, and the like. The 6-methylene steroids can be prepared in the manner of Burn et al., Tetrahedron, 20, 597–609 (1964).

After conducting the above described reaction, the 17-keto group of the compounds of the present invention can be converted by known procedures into the 17α-aliphatic-17β-hydroxy compounds of the present invention.

The 3-keto compounds can be reduced with sodium borohydride, lithium aluminum tri (t-butoxy) hydride, or the like, and the resulting 3β-hydroxy compound can then be selectively etherified with dihydropyran or dihydrofuran in the presence of p-toluenesulfonyl chloride or may be selectively esterified with, e.g. an acid anhydride in pyridine.

The novel compounds of the present invention possess valuable pharmacological properties. The compounds of Formulas A and B above wherein $R^5$ is hydrogen or lower alkyl, e.g. methyl, are valuable anabolic agents having a favorable anabolic/androgenic ratio. The compounds of Formulas A and B wherein $R^5$ is lower alkenyl or lower alkynyl demonstrate pituitary inhibition and progestational activity and are useful in the treatment of various menstrual disorder and in the control and regulation of fertility. The compounds of the present invention wherein $R^5$ is lower alkenyl also demonstrate marked anabolic activity. These compounds can be administered either orally or subcutaneously together with conventional pharmaceutical excipients at dosage rates of from about 0.01 mg. to 1.5 mg. per kilogram of body weight per day. However, dosages below or above this range can also be used, the most favorable dosage being dependent upon the purpose for which it is administered and the response thereto.

The following examples are provided to illustrate the present invention.

EXAMPLE 1

A solution of 1 g. of 6-methylene-17β-acetoxyandrost-4-en-3-one and 20 equivalents of sodium chlorodifluoroacetate in 25 ml. of diglyme is added dropwise with stirring under an atmosphere of nitrogen to 10 ml. of diglyme heated at reflux. After addition of the solution is complete, the reaction mixture is heated at reflux for about 30 minutes. The reaction mixture is then cooled, filtered and the thus-obtained filtrate evaporated to dryness under reduced pressure. The residue is then chromatographed to give 6 - spiro - (6'α,6'α-difluorocyclopropyl - 17β-acetoxyandrost-4-en-3-one and 6-spiro-(6'β,6'β-difluorocyclopropyl)-17β-acetoxyandrost-4-en-3-one which can be further purified, if desired, by fractional crystallization.

By repeating the above process using 6-methylene-19-norandrost-4-ene-3,17-dione, 6-methylene-17α-ethyl-17β-acetoxy-19-norandrost-4-en-3-one, 6-methylene-17α-methyl-17β-acetoxyandrost-4-en-3-one, 6-methylene-18-methyl-19-norandrost-4-ene-3,17-dione, and 6-methyleneandrost-4-ene-3,17-dione as the starting material in place of 6-methylene-17β-acetoxyandrost-4-en-3-one, there are obtained the corresponding 6-spiro-(6',6'-difluorocyclopropyl) compounds, that is, 6-spiro-(6'α,6'α-difluorocyclopropyl)-19-norandrost-4-ene-3,17-dione and 6-spiro-(6'β,6'β - difluorocyclopropyl - 19 - norandrost - 4 - ene-3,17-dione, 6-spiro-(6'α,6'α-difluorocyclopropyl)-17α-ethyl-17β-acetoxy-19-norandrost-4-en-3-one and 6-spiro(6'β, 6'β - difluorocyclopropyl) - 17α - ethyl - 17β - acetoxy-19-norandrost-4-en-3-one, 6-spiro-(6'α,6'α-difluorocyclopropyl) - 17α - methyl - 17β - acetoxyandrost - 4 - en - 3-one and 6-spiro-(6'β,6'β-difluorocyclopropyl)-17α-methyl-17β-acetoxyandrost-4-en-3-one, 6-spiro-(6'α,6'α-difluorocyclopropyl) - 18 - methyl - 19 - norandrost - 4 - ene - 3, 17-dione and 6-spiro-(6'β,6'β-difluorocyclopropyl)-18-methyl-19-norandrost-4-ene-3,17-dione, and 6-spiro-(6'α, 6'α-difluorocyclopropyl)-androst-4-ene-3,17-dione and 6-spiro - (6'β,6'β - difluorocyclopropyl) - androst - 4 - ene-3,17-dione, respectively.

EXAMPLE 2

Part A

The process of Example 1 is repeated with the exception that an equivalent amount of sodium trichloroacetate is substituted for sodium chlorodifluoroacetate and the corresponding 6-spiro-(6,6'-dichlorocyclopropyl) compounds are obtained, e.g. 6-spiro-(6'α,6'α-dichlorocyclopropyl)-17β-acetoxyandrost-4-en-3-one and 6-spiro-(6'β, 6'β - dichlorocyclopropyl) - 17β - acetoxy - androst - 4-en-3-one, 6-spiro-(6'α,6'α-dichlorocycloproyl)-19-norandrost-4-ene-3,17-dione and 6-spiro-(6'β,6'β-dichlorocyclopropyl)-19-norandrost-4-ene-3,17-dione, and 6-spiro-(6'α, 6'α - dichlorocyclopropyl - androst - 4 ene - 3,17 - dione and 6 - spiro - (6'β,6'β - dichlorocyclopropyl) - androst-4-ene-3,17-dione.

By repeating the process of Example 1 using an equivalent amount of sodium dichlorofluoroacetate in place of sodium chlorodifluoroacetate, the corresponding 6-spiro-[(6'-chloro-6'-fluoro)cyclopropyl] compounds are obtained, e.g. 6-spiro-[(6'α-chloro-6'α-fluoro)cyclopropyl]-17β-acetoxyandrost-4-en-3-one and 6-spiro-[(6'β-chloro-6'β - fluoro)cyclopropyl] - 17β - acetoxy - androst - 4 - en-3-one.

Part B

A mixture of 1 g. of 6-spiro-(6'α,6'α-difluorocyclopropyl)-androst-4-ene-3,17-dione, 100 ml. of benzene, 50 mg. of oxalic acid and 2 ml. of ethylene glycol is refluxed for 18 hours. The reaction mixture is then extracted with benzene and the benzene extracts washed with dilute aqueous sodium bicarbonate, water, dried and evaporated to dryness. The residue is subjected to thin layer chromatography using ethyl acetate:hexane (1:3) to give 3-cycloethylenedioxy - 6 - spiro - (6'α,6'α - difluorocyclopropyl)-androst-4-en-17-one.

By use of the above ketalization process, the other 3,17-diones of the present invention can be converted into the corresponding 3-ethyleneketal.

EXAMPLE 3

Part A

A solution of 5 g. of the 3-ethyleneketal of 6-spiro-(6'α, 6'α-difluorocyclopropyl)-androst-4-ene-3,17-dione in 250 ml. of thiophene-free benzene is treated with an equimolar amount of methylmagnesium bromide in anhydrous ether. The mixture is heated at reflux under anhydrous conditions for three hours, cooled, and cautiously treated with excess aqueous ammonium chloride solution. This mixture is then extracted with ethyl acetate and these extracts are in turn washed with water, dried over sodium sulfate and evaporated to dryness to yield the 3-ethyleneketal of 6-spiro-(6'α,6'α-difluorocyclopropyl-17α-methyl-17β-hydroxyandrost-4-en-3-one which is recrystallized from methylene chloride:hexane.

Part B

A mixture of 1 g. of the above 3-ethyleneketal, 2 g. of magnesium sulfate and 100 ml. of benzene is refluxed for about 24 hours. Completion of the reaction can be checked by thin layer chromatography. The reaction mixture is then cooled, filtered and the filtrate evaporated to dryness to yield 6-spiro-(6'α,6'α-difluorocyclopropyl)-17α-methyl-17β-hydroxyandrost-4-en-3-one.

By repeating the above process using the other 3-cycloethylenedioxy-17-keto compounds of the present invention as the starting material, the corresponding 17α-methyl-17β-hydroxy compounds are obtained.

Similarly, in place of the 6-spiro-(6'α,6'α-difluorocyclopropyl) compound employed above, there can be used the corresponding 6 - spiro - (6'β,6'β-difluorocyclopropyl) compounds, In the processes described herein, either the 6'α,6'α - dihalocyclopropyl or 6'β,6'β - dihalocyclopropyl isomers or a mixture of these isomers can be used as the starting material.

EXAMPLE 4

To a stirred solution of 2 g. of the 3-ethyleneketal of 6 - spiro - (6'α,6'α-difluorocyclopropyl)-19-norandrost-4-ene-3,17-dione in 250 ml. of absolute ether is added in a dropwise fashion and under nitrogen, an ethereal solution of 10 molar equivalents of ethyl lithium. The mixture is then stirred for 48 hours at room temperature, poured into water, acidified with hydrochloric acid and stirred vigorously for one hour. The ethereal phase is separated, washed with water to neutrality, dried over sodium sulfate and evaporated to dryness to yield the 3-ethyleneketal of 6 - spiro - (6'α,6'α - difluorocyclopropyl)-17α-ethyl-17β- hydroxy-19-norandrost-4-en-3-one which is further purified through recrystallization from acetone:hexane.

Using the procedure of Example 3 (Part B), the ethyleneketal protecting group is removed to give the corresponding 3-oxo compound.

By repeating the above process using the other 17-keto compounds of the present invention, the corresponding 17α-ethyl-17β-hydroxy compounds are obtained.

EXAMPLE 5

A solution of 1 g. of the 3-ethyleneketal of 6-spiro-(6'α, 6'α - difluorocyclopropyl)-19-norandrost-4-ene-3,17-dione in 30 ml. of anhydrous benzene is added under nitrogen to a solution of 1.4 g. of potassium in 30 ml. of t-amyl alcohol previously saturated with acetylene. A slow current of purified acetylene is continually passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields the 3-ethyleneketal of 6 - spiro-(6'α,6'α-difluorocyclopropyl)-17α-ethynyl-17β-hydroxy-19-norandrost-4-en-3-one which is recrystallized from acetone:hexane.

The thus-obtained compound is subjected to the procedure of Example 3 (Part B) to give 6-spiro-(6'α,6'α-difluorocyclopropyl) - 17α-ethynyl-17β-hydroxy-19-norandrost-4-en-3-one.

The above process is repeated with the exception of using other 17-keto compounds of the present invention, e.g. the 3-ethyleneketal of 6-spiro-(6'α,6'α-difluorocyclopropyl)-18-methyl-19-norandrost-4-ene-3,17-dione, as the starting material and the corresponding 17α-ethynyl-17β-hydroxy compounds are obtained, e.g. 6-spiro-(6'α,6'α-difluorocyclopropyl) - 18 - methyl-17α-ethynyl-17β-hydroxy-19-norandrost-4-en-3-one.

EXAMPLE 6

A solution of 8.5 g. of 1,2-dichloroethylene in 50 ml. of anhydrous ether is added in a dropwise fashion, under nitrogen and at 0° C., over a 30 minute period to a stirred solution of 15 ml. of 1.4 N methyl lithium in anhydrous ether. After stirring for an additional 90 minutes at room temperature, a solution of 0.5 g. of the 3-ethyleneketal of 6 - spiro - (6'α,6'α-difluorocyclopropyl)-19-norandrost-4-ene-3,17-dione in 20 ml. of anhydrous ether is added in a dropwise fashion with stirring over a 15 minute period. Stirring at room temperature is continued for 18 hours, and the reaction mixture is then poured into ice water and extracted with ether. These extracts are washed with water, dried over sodium sulfate and concentrated under reduced pressure. The residue is chromatographed on alkaline alumina with (8:2) hexane:ether to yield the 3-ethyleneketal of 6 - spiro - (6'α,6'α-difluorocyclopropyl)-17α - chloroethynyl - 17β-hydroxy-19-norandrost-4-en-3-one which may be recrystallized from methanol.

Subjecting the thus-obtained compound to the procedure of Example 3 (Part B), there is obtained the corresponding 3-oxo derivative.

EXAMPLE 7

To a solution of 1 g. of lithium aluminum hydride in 100 ml. of anhydrous tetrahydrofuran is continuously bubbled a slow current of purified acetylene for one hour. Thereafter, 1 g. of the 3-ethyleneketal of 6-spiro-(6'α,6'α-difluorocyclopropyl)-androst-4-ene-3,17-dione in 10 ml. of tetrahydrofuran is added and the reaction mixture is stirred at room temperature for four hours. Eight milliliters of water is then added and the mixture stirred for 30 minutes. The mixture is then filtered and the organic filtrate evaporated to yield the 3-ethyleneketal of 6-spiro-(6'α,6'α-difluorocyclopropyl) - 17α - ethynyl-17β-hydroxyandrost-4-en-3-one which is recrystallized from acetone:hexane. The ketal protecting group can be removed as described above (Example 3) to obtain the corresponding 3-oxo compound.

A mixture of 1 g. of 6-spiro-(6'α,6'α-difluorocyclopropyl) - 17α - ethynyl-17β-hydroxyandrost-4-en-3-one, 50 ml. of anhydrous tetrahydrofuran and 1 g. of lithium tri-t-butoxy-aluminum hydride is allowed to stand at about 20° C. for about 24 hours. Thereafter, the mixture is evaporated under reduced pressure to yield 6-spiro-(6'α, 6'α - difluorocyclopropyl - 17α-ethynylandrost-4-ene-3β, 17β-diol.

A mixture of 1 g. of the thus-obtained 3β,17β-diol, 1 g. of p-toluenesulfonic acid monohydrate, 50 ml. of acetic acid and 25 ml. of acetic anhydride is allowed to stand at room temperature for 24 hours and then is poured into water and stirred. This mixture is then extracted with methylene chloride and these extracts are dried and evaporated to yield 6-spiro-(6'α,6'α-difluorocyclopropyl)-17α-ethynylandrost-4-ene-3β,17β-diol 3,17-diacetate.

EXAMPLE 8

A solution of 3 g. of 6-spiro-(6'α,6'α-difluorocyclopropyl) - 17α - ethynyl-17β-hydroxy-19-norandrost-4-en-3-one in 125 ml. of dioxane is hydrogenated at 25° C./ 570 mm. with 0.5 g. of prehydrogenated 10% palladium-on-charcoal. Upon the consumption of the theoretical amount of hydrogen, the solution is filtered and the filtrate evaporated to dryness under reduced pressure to yield 6-spiro-(6'α,6'α-difluorocyclopropyl)-17α-ethyl-17β-hydroxy-19-norandrost-4-en-one which is recrystallized from acetone.

EXAMPLE 9

A solution of 1 g. of 6-spiro-(6'α,6'α-dichlorocyclopropyl) - 17α - ethylnyl-17β-hydroxyandrost-4-en-3-one in 40 ml. of pyridine is hydrogenated at 25° C. atmospheric pressure in the presence of 0.4 g. Lindlar catalyst. When 1.1 molar equivalents of hydrogen are absorbed, the reaction is stopped. The catalyst is removed by filtration through Celite diatomaceous earth and washed with ethyl acetate and the combined filtrate and washings are evaporated to dryness under reduced pressure. The residue is dissolved in ethyl acetate and this solution then washed with dilute hydrochloric acid and water to neutrality, dried and evaporated to dryness to yield 6-spiro-(6'α,6'α-dichlorocyclopropyl) - 17α - vinyl-17β-hydroxyandrost-4-en-3-one which is further purified through recrystallization from acetone.

EXAMPLE 10

A solution of 1 g. of sodium borohydride in 3 ml. of water is added to an ice-cooled solution of 1 g. of 6-spiro - (6'α,6'α-difluorocyclopropyl) - 17α-ethynyl-17β-hydroxy-19-norandrost-4-en-3-one in 120 ml. of methanol and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 6-spiro-(6'α,6'α-difluorocyclopropyl)-17α-ethynyl-19-norandrost-4-ene-3β,17β-diol which may be further purified by the crystallization from acetone:hexane.

Similarly, by use of the above process, other 3-keto compounds of the present invention can be converted into the corresponding 3β-hydroxy derivative.

EXAMPLE 11

A mixture of 1 g. of 6-spiro-(6'α,6'α-difluorocyclopropyl)-17α-ethynylestr-4-ene-3β,17β-diol, 4 ml. of pyridine and 2 ml. of acetic anhydride is allowed to stand at room temperature for 15 hours. The mixture is then poured into ice water and the solid which forms is collected by filtration, washed with water and dried to yield 6 - spiro-(6′α,6′α-difluorocyclopropyl)-17α-ethynylestr-4-ene-3β,17β-diol 3-acetate which can be further purified through recrystallization from acetone:hexane.

Through the use of other anhydrides in the foregoing procedures, the corresponding 3β-acylates are obtained.

EXAMPLE 12

A mixture of 1 g. of 6-spiro-(6′α,6′α-difluorocyclopropyl)-17α-ethynyl-19-norandrost-4-ene-3β,17β-diol, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 6 - spiro - (6′α,6′α-difluorocyclopropyl) - 17α-ethynyl-19-norandrost-4-ene-3β,17β - diol 3,17 - diacetate which is recrystallized from acetone:ether.

EXAMPLE 13

A solution of 0.17 g. of potassium hydroxide in 0.2 ml. of water and 2.5 ml. of methanol is added over 30 minutes to a refluxing solution of 1 g. of 6-spiro-(6′α,6′α-difluorocyclopropyl)-17β-acetoxyandrost-4-en-3-one in 30 ml. of methanol under nitrogen. The solution is refluxed for two hours, cooled, neutralized with acetic acid and concentrated under reduced pressure. After the addition of water, the solid which forms is collected by filtration and dried to yield 6-spiro-(6′α,6′α-difluorocyclopropyl)-17β-hydroxyandrost-4-en-3-one which is recrystallized from acetone:hexane.

Through use of the above process, the other 17β-acylates of the present invention, e.g. 6-spiro-(6′α,6′α-difluorocyclopropyl)-17β-acetoxy-19-norandrost-4-en-3-one, are converted into the corresponding 17β-hydroxy compounds, e.g. 6-spiro-(6′α,6′α-difluorocyclopropyl)-17α-hydroxy-19-norandrost-4-en-3-one.

EXAMPLE 14

A mixture of 2 g. of 6-spiro-(6′α,6′α-difluorocyclopropyl)-17β-hydroxy-19-norandrost-4-en-3-one in 8 ml. of pyridine and 4 ml. of adamantoyl chloride is heated at steam bath temperatures for one hour. The mixture is then poured into ice water and the solid which forms is collected by filtration, washed with water and dried to yield 6-spiro-(6′α,6′α-difluorocyclopropyl)-17β-adamantoyloxy-19-norandrost-4-en-3-one which is further purified through recrystallization from methylene chloride:hexane.

EXAMPLE 15

A mixture of 1 g. of 6-spiro-(6′α,6′α-difluorocyclopropyl)-17α-ethylnyl-17β-hydroxy-19-norandrost - 4 - en - 3-one, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 6-spiro-(6′α,6′α-difluorocyclopropyl) - 17α-ethynyl-17β-acetoxy-19-norandrost-4-en-3-one which is recrystallized from acetone:ether.

EXAMPLE 16

A mixture of 1 g. of 6-spiro-(6′α,6′α-difluorocyclopropyl)-17β-hydroxyandrost-4-en-3-one, 1 g. of p-toluenesulfonic acid monohydrate, 25 ml. of propionic acid anhydride and 50 ml. of propionic acid is allowed to stand at room temperature for 24 hours and is then poured into water and stirred. This mixture is then extracted with methylene chloride and these extracts are dried and evaporated to yield 6-spiro-(6′α,6′α-difluorocyclopropyl)-17β-hydroxyandrost-4-en-3-one 17-propionate.

EXAMPLE 17

A mixture of 1 g. of 6-spiro-(6′α,6′α-difluorocyclopropyl)-17α-ethynyl-17β-acetoxyestr-4-en-3-one, 50 ml. of anhydrous tetrahydrofuran and 1 g. of lithium tri-t-butoxyaluminum hydride is allowed to stand at about 20° C. for about 24 hours. Thereafter, the mixture is evaporated under reduced pressure to yield 6-spiro-(6′α,6′α-difluorocyclopropyl)-17α-ethynyl-17β-acetoxyestr-4 - en - 3β - ol which can be purified by chromatography or recrystallization from acetone:hexane.

A solution of 0.17 g. of potassium hydroxide in 0.2 ml. of water and 2.5 ml of methanol is added over 30 minutes to a refluxing solution of 1 g. of the above compound in 30 ml. of methanol under nitrogen. The solution is refluxed for two hours, cooled, neutralized with acetic acid and concentrated under reduced pressure. After the addition of water, the solid which forms is collected by filtration and dried to yield 6-spiro-(6′α,6′α-difluorocyclopropyl)-17α-ethynylestr-4-ene-3β,17β-diol which is recrystallized from acetone:hexane.

EXAMPLE 18

Two milliliters of dihydropyran are added to a solution of 1 g. of 6-spiro-(6′α,6′α-difluorocyclopropyl)-17β-hydroxyestr-4-en-3-one in 15 ml. of benzene. About 1 ml. is removed by distillation to remove moisture and 0.4 g. of p-toluenesulfonic acid is added to the cooled solution. This mixture is allowed to stand at room temperature for four days, and is then washed with aqueous sodium carbonate solution and water, dried and evaporated. The residue is chromatographed on neutral alumina, eluting with hexane, to yield 6-spiro-(6′α, 6′α-difluorocyclopropyl)-17β(-tetrahydropyran-2′-yloxy)estr-4-en-3-one which is recrystallized from pentane.

Use of this process with the other 17β-hydroxy compounds of the present invention will similarly yield the corresponding 17β-tetrahydropyranyloxy derivatives.

Similarly, by repeating the above process with the exception of using dihydrofuran in place of dihydropyran, the corresponding 17β-(tetrahydrofuran-2′-yloxy) derivatives are obtained.

EXAMPLE 19

One gram of 6-spiro-(6′α,6′α-difluorocyclopropyl)-17α-ethynly-19-norandrost-4-ene-3β,17β-diol 3,17-diacetate is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 6-spiro-(6′α,6′α-difluorocyclopropyl)-17α-ethynyl-19 - norandrost-4-ene-3β,17β-diol 17-acetate which is collected by filtration and recrystallized from acetone:hexane.

By repeating the procedure of Example 18 using the above 3β-hydroxy compound, there is obtained 6-spiro-(6′α,6′α-difluorocyclopropyl)-3β - (tetrahydropyran-2′-yloxy)-17α-ethynyl-19-norandrost-4-en-17β-ol 17-acetate.

EXAMPLE 20

Five milliliters of dihydropyran are added to a solution of 1 g. of 6-spiro-(6′α,6′α-difluorocyclopropyl)-17α-ethynylandrost-4-ene-3β,17β-diol in 15 ml. of benzene. About 1 ml. is removed by distillation to remove moisture and 0.4 g. of p-toluenesulfonic acid is added to the cooled solution. This mixture is allowed to stand at room temperature for four days, and is then washed with aqueous sodium carbonate solution and water, dried and evaporated. The residue is chromatographed on neutral alumina, eluting with hexane, to yield 6-spiro-(6′α,6′α-difluorocyclopropyl)-17α-ethynyl-3β,17β - bis(tetrahydropyran-2′-yloxy)-androst-4-ene which is recrystallized from pentane.

What is claimed is:
1. A compound selected from those having the following Formulas A and B:

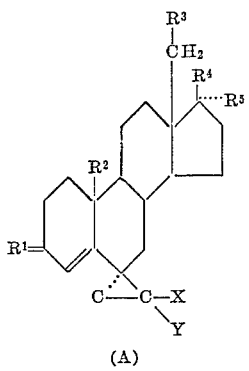 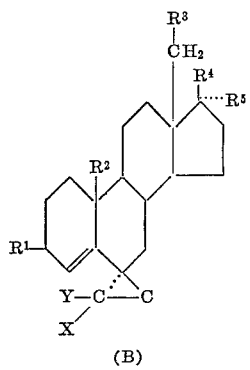

(A)                 (B)

wherein:
each of X and Y is chloro or fluoro;
$R^1$ is oxo or the group

in which $R^6$ is hydroxy and the conventional hydrolyzable esters thereof, tetrahydropyran-2-yloxy or tetrahydrofuran-2-yloxy;
$R^2$ is hydrogen or methyl;
$R^3$ is hydrogen, methyl, ethyl or n-propyl;
$R^4$ is hydroxy and the conventional hydrolyzable esters thereof, tetrahydropyran-2-xyloxy or tetrahydrofuran-2-yloxy; and
$R^5$ is hydrogen, lower alkyl, lower alkenyl, lower alkynyl, halo lower alkynyl, or when taken together with $R^4$ is oxo.

2. A compound according to claim 1 wherein $R^1$ is oxo and each of X and Y is fluoro.
3. A compound according to claim 1 wherein $R^1$ is oxo and each of X and Y is chloro.
4. A compound according to claim 2 wherein $R^2$ is methyl and $R^5$ is hydrogen.
5. A compound according to claim 2 wherein $R^2$ is hydrogen and $R^5$ is hydrogen.
6. A compound according to claim 2 wherein $R^2$ is hydrogen, $R^4$ is hydroxy and $R^5$ is ethynyl.
7. A compound according to claim 2 wherein $R^2$ is hydrogen, $R^4$ is acetoxy and $R^5$ is ethynyl.
8. A compound according to claim 2 wherein $R^2$ is hydrogen, $R^4$ is hydroxy and $R^5$ is ethyl.
9. A compound according to claim 2 wherein each of $R^2$ and $R^5$ is methyl and $R^4$ is hydroxy.
10. A compound according to claim 1 wherein $R^1$ is the group

in which $R^6$ is acetoxy, $R^2$ is hydrogen, $R^4$ is acetoxy, $R^5$ is ethynyl and each of X and Y is fluoro.

References Cited
UNITED STATES PATENTS
3,373,157    3/1968    Georgian et al. ____ 260—239.55

LEWIS GOTTS, Primary Examiner
ETHEL G. LOVE, Assistant Examiner

U.S. Cl. X.R.
260—239.5, 239.55, 397.3, 397.5, 999